United States Patent [19]

Baker

[11] Patent Number: 5,416,056
[45] Date of Patent: May 16, 1995

[54] PRODUCTION OF HIGHLY MICROPOROUS ACTIVATED CARBON PRODUCTS

[75] Inventor: Frederick S. Baker, Wando, S.C.

[73] Assignee: Westvaco Corporation, New York, N.Y.

[21] Appl. No.: 143,551

[22] Filed: Oct. 25, 1993

[51] Int. Cl.⁶ .................. C01B 31/12; B01J 20/20
[52] U.S. Cl. .................. 502/425; 502/426; 502/427
[58] Field of Search ........... 502/425, 426, 427, 416, 502/417, 437, 526

[56] References Cited

U.S. PATENT DOCUMENTS

| | | | |
|---|---|---|---|
| 5,098,880 | 3/1992 | Gaffney et al. | 502/437 |
| 5,102,855 | 4/1992 | Greinke et al. | 502/425 |
| 5,204,310 | 4/1993 | Tolles et al. | 502/425 |
| 5,206,207 | 4/1993 | Tolles | 502/426 |
| 5,212,144 | 5/1993 | Schwartz, Jr. | 502/425 |
| 5,238,470 | 8/1993 | Tolles et al. | 502/416 |
| 5,250,491 | 10/1993 | Yan | 502/425 |
| 5,276,000 | 1/1994 | Matthews et al. | 502/424 |
| 5,292,706 | 3/1994 | Chang et al. | 502/526 |
| 5,304,527 | 4/1994 | Dimitri | 502/416 |
| 5,324,703 | 6/1994 | McCue et al. | 502/424 |

Primary Examiner—Anthony McFarlane
Attorney, Agent, or Firm—Terry B. McDaniel; Daniel B. Reece, IV; Richard L. Schmalz

[57] ABSTRACT

A two-stage process for chemical activation of lignocellulose-derived carbon is disclosed comprising a first activation stage of blending a lignocellulose material with phosphoric acid, carbonizing the blend at from about 300° F. to about 1,100° F. (about 150°–590° C.), and water washing the carbonized material and a second activation stage of blending the carbonized material with a potassium hydroxide solution, activating this blend at from about 1,200° to about 1,800° F. (about 650°–980° C.), and water washing and drying the microporous activated carbon product, which is characterized by greater than 50% of its total pore volume comprising pores of less than 16 Å in width and greater than 80% of its total pore volume comprising pores of less than 20 Å in width and greater than 95% of its total pore volume comprising pores of less than 50 Å in width.

5 Claims, 2 Drawing Sheets

PRODUCTION OF HIGHLY MICROPOROUS ACTIVATED CARBON PRODUCTS

BACKGROUND OF THE INVENTION (1) Field of the Invention

The present invention is directed to the production of activated carbon. More particularly, it is directed to the production of highly microporous activated carbon from a lignocellulosic material. Specifically, the present invention is directed to the production of highly microporous activated carbon from a lignocellulosic precursor by a two stage chemical activation process employing, sequentially, phosphoric acid and potassium hydroxide. One use of such activated carbon is in the adsorption of gases, including natural gas.

(2) Description of the Prior Art

Practical storage of natural gas for such uses as a vehicle fuel and the like involves portable containerization of the natural gas. Natural gas is a leading contender for use as an alternative fuel for automobiles, particularly in areas designated as "zero emission" zones under the 1990 Clean Air Act. The majority of natural gas vehicle's operating in the United States use compressed natural gas at pressures of up to about 3500 psi. However, low pressure storage systems are being developed in which natural gas is contained in cylinders packed with adsorbent material to achieve near-liquid methane density. Economic evaluations by the natural gas industry indicate that adsorbed natural gas (ANG) would be comparable economically with compressed natural gas (CNG) at a deliverable gas capacity of 150 volumes of gas per cylinder volume (v/v) at a storage pressure of 500 psi.

Natural gas, which is primarily methane, is adsorbed in pores and on surfaces of the adsorbent medium. Under such conditions, the adsorbed gas assumes properties not unlike those of its liquid state. Typical adsorbents are solids with pores and fissures throughout their structure. Methane molecules preferentially adsorb in pores having a diameter of about 10–15 Angstroms (Å).

Active carbon long has been used for removal of impurities and recovery of useful substances from liquids and gases because of its high adsorptive capacity. Generally, "activation" refers to any of the various processes by which the pore structure is enhanced. Typical activation processes involve treatment of carbon sources—such as resin wastes, coal, coal coke, petroleum coke, and lignocellulosic materials including residues from pulp production, wood (like wood chips, sawdust, and wood flour), nut shell (like almond shell and coconut shell), kernel, and fruit stone (like olive and cherry stone)—either thermally (with an oxidizing gas) or chemically (usually with phosphoric acid or metal salts). Such activated carbons maintain the original macrostructure of the starting material and, therefore, a similar pore distribution of micropores of less than 20 Å in width, mesopores of 20 Å to 500 Å (divided between small mesopores of 20 Å to less than 50 Å in width and large mesopores of 50 Å to 500 Å in width), and macropores of greater than 500 Å in width.

Commercial ANG carbons currently provide up to 100 v/v at a storage pressure of 500 to 900 psi (see U.S. Pat. No. 4,522,159). It is highly desirable to provide 100 v/v or greater storage capacity due to limitations of inexpensive compressor technology. Storage pressures of 900 psi represent an upper limit due to DOT regulations regarding transport and testing of gas cylinders.

As the surface area of an active carbon is proportional to the carbon is microporosity and since the methane adsorption capacity of an active carbon is enhanced by increasing its microporosity, activation methods are sought which are pore size specific to improve over current commercial ANG active carbon.

Citing disclosures of potassium hydroxide (KOH) activation of coal in U.S. Pat. Nos. 3,764,561 and 4,082,694, the patentees of U.S. Pat. No. 4,769,359 teach the production of active carbon which enables high adsorption of gases per unit volume by treating coal with a liquid mixture comprising KOH and sodium hydroxide (NaOH) and subsequently carbonizing at 500°–800° C. A method of producing activated carbon with a large surface area and a low sulfur content also is taught in U.S. Pat. No. 5,064,805 by mixing coconut shell char with melted potassium hydroxide hydrate at a temperature sufficiently high to cause activation. Also, U.S. Pat. No. 4,082,694 teaches solid KOH activation of specific carbonaceous feeds including coal, coal coke, and petroleum coke to produce cage-like microporous structures particularly useful for water purification.

Chemical activation of wood-based carbon with phosphoric acid ($H_3PO_4$) is disclosed in U.S. Pat. No. Re. 31,093 to improve the carbon's decolorizing and gas adsorbing abilities. Also, U.S. Pat. No. 5,162,286 teaches phosphoric acid activation of wood-based material which is particularly dense and which contains a relatively high (30%) lignin content, such as nut shell, fruit stone, and kernel. Zinc chloride ($ZnCl_2$) also is a common chemical activation agent. Phosphoric acid activation of lignocellulose material also is taught in U.S. Pat. No. 5,204,310 as a step in preparing carbons of high activity and high density.

None of these activated carbons or other known carbons, however, achieve the desired objective of providing 150 v/v of deliverable gas capacity at 500 psi. At this storage pressure, known commercial carbons have achieved, at best, about 120 v/v of deliverable gas capacity. Therefore, the objective of this invention is to provide a highly microporous activated carbon of improved capacity (i.e., greater than 120 v/v at 500 psi) and preferably, a further objective is that the carbon is capable of meeting the industry target (i.e., 150 v/v) for a deliverable capacity of natural gas stored on activated carbon at 500 psi. Also, it is an objective of this invention to provide a process for producing the highly microporous activated carbon. It is an even further objective of this invention to provide a method for storing natural gas at low pressure using the highly microporous activated carbon.

SUMMARY OF THE INVENTION

The objectives of this invention are accomplished by a process whereby highly microporous activated carbon products are produced by a two-stage activation of lignocellulosic material with phosphoric acid and KOH, respectively. The first activation stage comprises blending a lignocellulose material with phosphoric acid, carbonizing/activating the blend at from about 300° to about 1,100° F.(~150°-590° C.), and washing the carbonized material with water to remove and recover the phosphoric acid carbonization/activation agent. The second activation stage comprises blending the carbonized material with a potassium hydroxide solution, activating this blend at from about 1,200° to about 1,800° F. (~650°-980° C.), and water washing and drying the microporous activated carbon. The micropore volume and pore size distribution of the activated carbon so obtained are such that the products are useful for adsorbed natural gas storage. Additionally, the adsorption properties of the activated carbon according to the present invention permit its use in applications such as fractionation of hydrocarbons, purification of industrial gases, anti-pollution devices, liquid-phase purification processes in food and chemical industries, water treatment, liquid-phase recovery and separation, catalysts or catalyst supports, solid sorption heat pumps, refrigeration systems, batteries, analysis, and medicinal uses, among others.

DETAILED DESCRIPTION OF THE PREFERRED EMBODIMENT(S)

Figure 1:
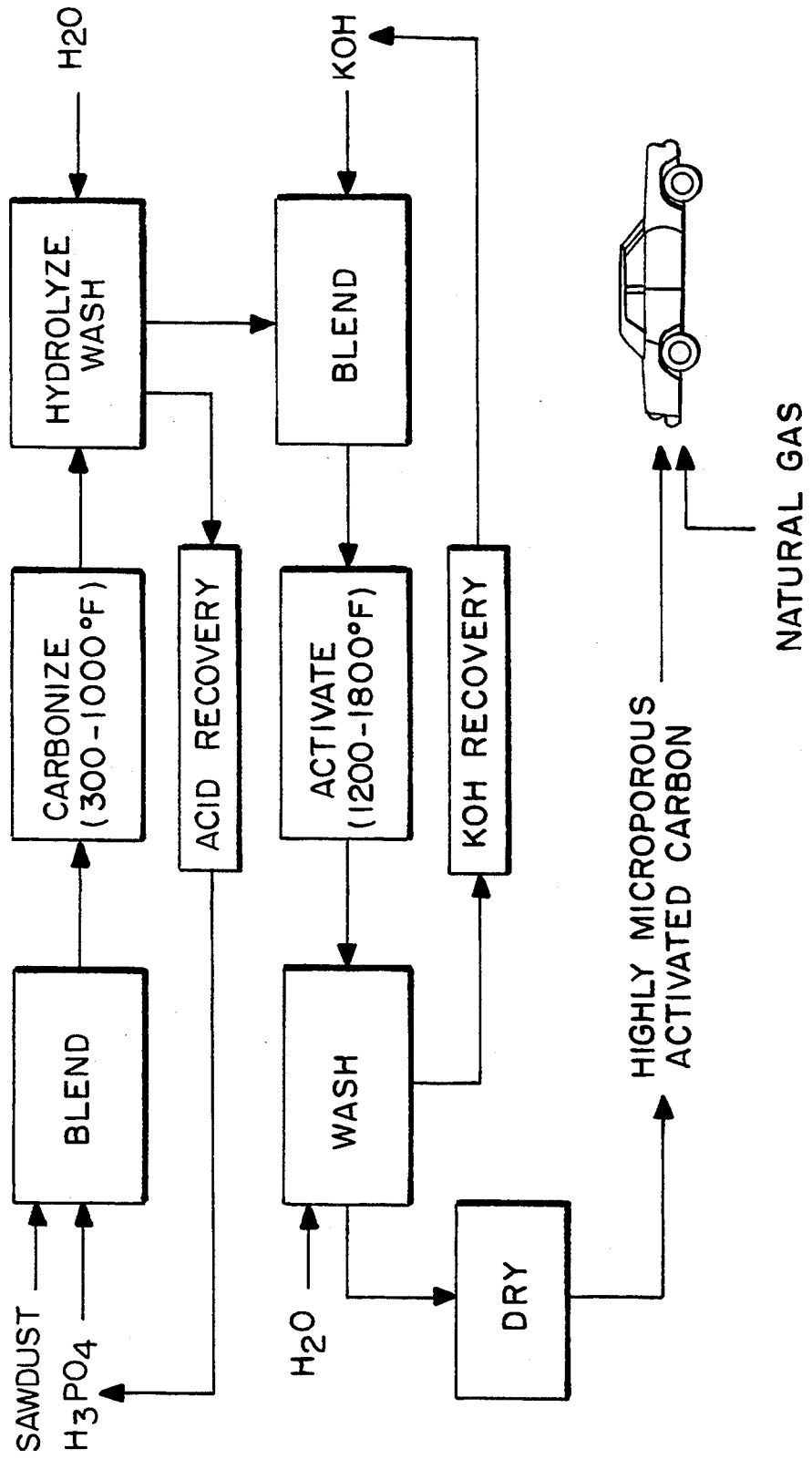
FIG. 1 represents a flow diagram of the invention two-stage activation process.

Phosphoric acid is an excellent carbonization agent, but at temperatures above about 600° F. (about 315° C.) polymerization of the acid creates wide pores that are not useful for methane adsorption. Activation of carbonaceous precursors with KOH appears to produce micropores of the pore size hypothesized as being the most favorable for methane adsorption, i.e., about 11-12 Å width. The benefit of the two-stage $H_3PO_4$/KOH process is to exploit the merits of different chemical activation agents but, at the same time, eliminate adverse effects. In the two-stage $H_3PO_4$/KOH activation process shown as a schematic in FIG. 1, wood is blended with phosphoric acid (1st stage) at an acid to wood ratio of from about 0.5:1 to about 3:1, preferably from about 1:1 to about 2:1. Next, the blend is heated at temperatures that induce both carbonization and activation, and the acid is removed from the system. The product of the first stage then is chemically activated further by blending with potassium hydroxide at a KOH to carbon ratio of from about 0.5:1 to about 4:1 at higher temperatures (2nd stage) to yield a product suitable for natural gas storage. The first stage carbonization temperature is from about 300° to about 1,100° F.(~150°-590° C.), preferably from about 800° to about 1,000° F. (~430°-540° C.), and the second stage higher activation temperature is from about 1,200° to about 1,800° F. (~650°980° C.), preferably from about 1,400° to about 1,700° F. (~760°-930° F.). The process is economically carried out by recovering phosphoric acid from the wash water at the end of the first stage and recycling it to form the subsequent first stage blend. Similarly, the economy of the process is enhanced by recovering potassium salts from the wash water of the second stage and recovering and recycling potassium hydroxide to form a subsequent second stage blend.

The highly microporous activated carbon product of the invention two-stage activation is characterized by greater than 80% of the total pore volume comprising pores of less than 20 Å in width and by greater than 95% of the total pore volume comprising pores of less than 50 Å in width. Preferably, the product is characterized by greater than 85% of the total pore volume comprising pores of less than 20 Å in width and by greater than 99% of the total pore volume comprising pores of less than 50 Å in width. The invention two-stage activation product is characterized further by a pore volume of greater than 0.7 cc/g in pores of less than 20 Å in width.

First Stage

The temperature range for the $H_3PO_4$-activation stage should be from about 300° to about 1,100° F. (about 150°-590° C.), preferably from about 800° to about 1,000° F. (about 425°-540° C.). In the experiments reported below, the second stage KOH activation was most readily accomplished by activating a current Westvaco wood-based activated carbon commercial product, WV-A 1100, which is a high activity product with a pore size distribution tailored to the capture of evaporative gasoline emissions and produced under the above-described first stage $H_3PO_3$ activation. Preparation of the WV-A 1100 product is as set forth in U.S. Re. 31,093, which is incorporated herein by reference. Specifically, sawdust at 42% moisture content is mixed with phosphoric acid at an acid to sawdust ratio of 1.4:1. The mixture is subjected to a carbonizing/activation temperature of 1,050° F. for 45 minutes. After cooling, the activated carbon is washed to remove residual phosphoric acid, is dried, and is screened to 10×25 mesh granules.

Alternatively, other examples of phosphoric acid activated lignocellulose material suitable for subsequent KOH activation according to the invention are the high butane working capacity (BWC) carbons (and methods of their preparation) reported in U.S. Pat. Nos. 5,204,310, 5,206,207, 5,238,470, and 5,250,491, the disclosures of which are incorporated herein by reference. Preparation of these products involve a more sophisticated and controlled phosphoric acid treatment whereby the lignocellulosic material is subjected to a mechanical densification treatment at its point of transition from plastic to thermoset followed by final activation consistent with the range for the WV-A 1100 product.

Basically, the invention includes a subsequent KOH activation of phosphoric acid activated lignocellulosic materials. Just as these tested examples of phosphoric acid activated lignocellulosic materials were suitable precursors, other lignocellulosic materials activated with phosphoric acid by the same or similar methods are suitable for treatment by the second stage activation described herein.

Second Stage

Granular, 10×25 mesh WV-A 1100 product (700 g) was impregnated with a solution of KOH (60 wt %, at 200° F.) at a KOH/char ratio of 2:1 (dry basis). The impregnated carbon was loaded into a stainless steel retort of an indirect-fired rotary kiln. The temperature of the bed was evenly increased from near ambient to 1700° F. over a period of 4 hours. An "inert" atmosphere in the retort was maintained by a flow of nitrogen gas. When the target temperature was attained, the bed was allowed to cool to near ambient temperature. A nitrogen atmosphere was maintained in the retort during cooling. The free-flowing, granular product was removed from the kiln and washed with water at 180° F. The pH of the eluent water upon termination of product washing was 7.5. The product (TSA14) was dried at 230° F. in a convection oven. Product yield was 500 g; i.e., a yield of 80% on a carbon basis.

Key methane storage data for these and other similarly $H_3PO_4$/KOH sequentially activated products are recorded in the following Table I. Explanatory notes for the methane storage measurements are included at the foot of Table I. To show the benefits of subsequent KOH activation, data are included for the WV-A 1100 product produced using the conventional prior art wood-based activation process (i.e., first stage activation with $H_3PO_4$ only).

TABLE 1

METHANE STORAGE CAPACITY OF TWO-STAGE ($H_3PO_4$/KOH) ACTIVATED WOOD-BASED CARBON

| SURFACE AREA, PORE VOLUME, AND METHANE ADSORPTION DATA | $H_3PO_4$ Act'd Prod. | TSA14 |
|---|---|---|
| 2nd Stage KOH/Char Ratio | 0[a] | 2:1 |
| 2nd Stage Temperature (°F.) | — | 1700 |
| Surface Area ($m^2g^{-1}$) | 2406 | 2102 |
| Pore Volume (cc/g): | | |
| <16Å Width | 0.14 | 0.55 |
| <20Å Width | 0.40 | 0.81 |
| <50Å Width | 1.31 | 0.98 |
| <1000Å Width | 1.63 | 0.99 |
| Pore Vol Ratio: | | |
| <16Å/<1000Å (%) | 8 | 55 |
| <20Å/<1000Å (%) | 25 | 82 |
| <50Å/<1000Å (%) | 80 | 98 |
| Total $CH_4$ Capacity (v/v)[b] | 93 | 170 |
| Deliverable $CH_4$ Capacity (v/v)[c] | 90 | 153 |
| Methane Weight Activity (wt %)[d] | 8.9 | 18.0 |
| Retentivity (% of $CH_4$ Uptake)[e] | 3 | 12 |
| Apparent Density (g/cc)[f] | 0.50 | 0.53 |

[a] Activation with $H_3PO_4$ only, to temperature of 1000° F.
[b] The total methane storage capacity of the carbon was computed from the amount of methane adsorbed, at a pressure of 500 psi, when the temperature of the sample returned to ambient temperature.
[c] The deliverable methane storage capacity was computed from the amount of methane desorbed when the pressure in the test cylinder was progressively reduced from 500 psia to 15 psia. Again, the temperature of the sample was allowed to returned to ambient before the measurement was made. Desorption of methane was allowed to occur without restriction of the lowest temperature reached as a result of the endothermic desorption process.
[d] The weight activity of the carbon was computed from the amount of methane adsorbed on the carbon, at a pressure of 500 psi, when the temperature of the sample returned to ambient temperature. This figure does not include the amount of methane contained in the void space (between carbon particles) within the test cylinder at 500 psi ("compressive storage").
[e] The retentivity of the carbon, expressed as a proportion of the amount of methane adsorbed on the carbon at 500 psia, is defined as the amount of methane retained by the carbon at 15 psia when the sample has attained ambient temperature. Again, this figure does not include the amount of methane retained in the test cylinder at 15 psia as a result of compressive storage in the void volume.
[f] The apparent density of the carbon was computed from the weight of sample contained in the 50 cc test cylinder.

The test data in Table 1 illustrate that highly microporous products can be obtained from wood by a two-stage activation process comprising a first stage phosphoric acid activation and a second stage activation with potassium hydroxide. It is equally clear that the target gas storage capacity of 150 v/v at 500 psi, for NGV use, can be achieved with a wood-based activated carbon.

The methane activity of product TSA14 was 18.0 wt %, more than double the activity of the conventional wood-based WV-A 1100 product.

Additional samples were prepared (employing WV-A 1100 as the first stage product) for further comparisons of the influence of second stage KOH:carbon ratio. These results are reported in Table 2.

TABLE 2

| PRODUCT PROPERTY | SURFACE AREA, PORE VOLUME, AND METHANE ADSORPTION DATA | | | | |
|---|---|---|---|---|---|
| | TSA-17 | TSA-31 | TSA-7 | TSA-18 | TSA-22 |
| 2nd Stage KOH/Char Ratio | 1:1 | 1.5:1 | 2:1 | 2.4:1 | 3:1 |
| 2nd Stage Temperature (°F.) | 1600 | 1600 | 1600 | 1600 | 1600 |
| Surface Area ($m^2g^{-1}$) | 1066 | 1854 | 2514 | 2491 | 2425 |
| Pore Volume (cc/g): | | | | | |
| <16Å Width | 0.42 | 0.63 | 0.74 | 0.56 | 0.23 |
| <20Å Width | 0.46 | 0.78 | 1.02 | 0.92 | 0.56 |
| <50Å Width | 0.50 | 0.87 | 1.17 | 1.16 | 1.24 |
| <1000Å Width | 0.51 | 0.87 | 1.18 | 1.19 | 1.34 |
| Pore Vol Ratio: | | | | | |
| <16Å/<1000Å (%) | 82 | 72 | 62 | 47 | 17 |
| <20Å/<1000Å (%) | 90 | 90 | 86 | 78 | 42 |
| <50Å/<1000Å (%) | 98 | 99 | 99 | 97 | 93 |
| Total $CH_4$ Capacity (v/v) | 149 | 174 | 169 | 163 | 147 |
| Deliverable $CH_4$ Capacity (v/v) | 121 | 144 | 145 | 145 | 134 |
| Methane Weight Activity (wt %) | 11.4 | 16.5 | 17.9 | 18.1 | 19.6 |
| Retentivity (% of $CH_4$ Uptake) | 22 | 20 | 16 | 13 | 10 |
| Apparent Density (g/cc) | 0.74 | 0.60 | 0.53 | 0.51 | 0.40 |

For a comparison of the WV-A 1100 and the BWC phosphoric acid activated products upon subsequent activation with KOH, samples were compared under similar second stage activation conditions and the results are reported in Table 3.

TABLE 3

| PRODUCT PROPERTY | SURFACE AREA, PORE VOLUME, AND METHANE ADSORPTION DATA | | | | |
|---|---|---|---|---|---|
| | TSA-16 | TSA-8 | TSA-14 | TSA-10 | TSA-15 |
| Precursor Carbon | | WV-A 1100 | | | BWC |
| 2nd Stage KOH/Char Ratio | | 2:1 | | | 2:1 |
| 2nd Stage Temperature (°F.) | 1400 | 1600 | 1700 | 1600 | 1700 |
| Surface Area ($m^2g^{-1}$) | 1852 | 2163 | 2102 | 2366 | 1775 |
| Pore Volume (cc/g): | | | | | |
| <16Å Width | 0.63 | 0.66 | 0.55 | 0.62 | 0.55 |
| <20Å Width | 0.78 | 0.88 | 0.81 | 0.93 | 0.72 |
| <50Å Width | 0.86 | 1.00 | 0.98 | 1.09 | 0.84 |
| <1000Å Width | 0.88 | 1.02 | 0.99 | 1.11 | 0.85 |
| Pore Vol Ratio: | | | | | |
| <16Å/<1000Å (%) | 72 | 65 | 55 | 56 | 64 |
| <20Å/<1000Å (%) | 89 | 87 | 82 | 84 | 84 |
| <50Å/<1000Å (%) | 99 | 98 | 98 | 98 | 98 |
| Total $CH_4$ Capacity (v/v) | 170 | 166 | 170 | 170 | 172 |
| Deliverable $CH_4$ Capacity (v/v) | 151 | 147 | 153 | 152 | 152 |
| Methane Weight Activity (wt %) | 16.4 | 17.1 | 18.0 | 18.0 | 17.7 |
| Retentivity (% of $CH_4$ Uptake) | 13 | 13 | 12 | 12 | 13 |
| Apparent Density (g/cc) | 0.59 | 0.55 | 0.53 | 0.53 | 0.55 |

A total methane storage capacity of greater than 170 v/v at 500 psi has been achieved, an increase of greater than 80% over they total capacity of the WV-A 1100 product obtained through activation of wood with $H_3PO_4$ alone. The deliverable capacity of the product is 153 v/v, improving over the target of 150 v/v for economical natural gas vehicle use.

Figure 2:
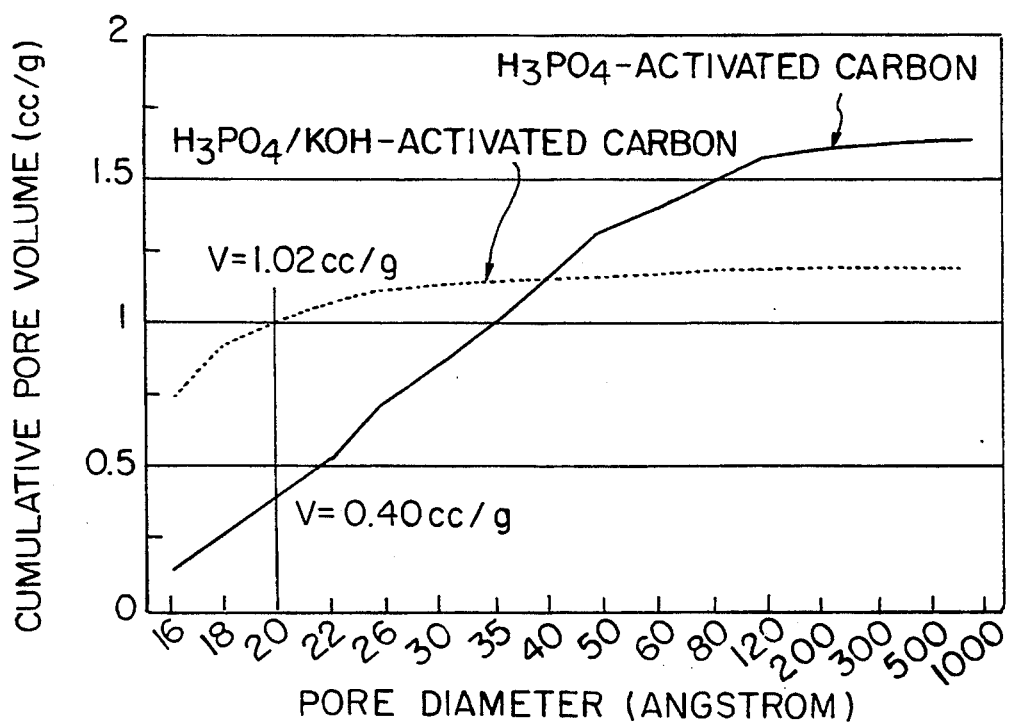
FIG. 2 graphically depicts the enhancement of micropore volume produced by the second stage activation of the product of the first activation stage based on cumulative pore volume.
Figure 3:
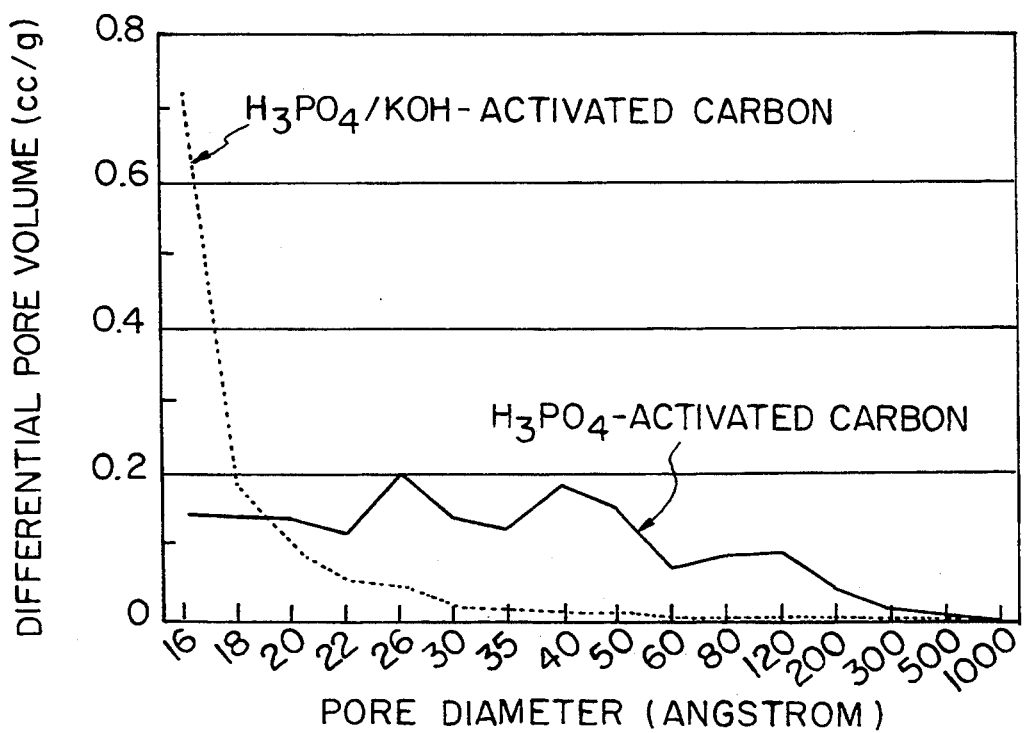
FIG. 3 graphically depicts the enhancement of micropore volume produced by the second stage activation of the product of the first activation stage based on differential pore volume.

With respect to pore size distribution, the nitrogen adsorption data shown in FIGS. 2 and 3 and in Table I illustrate the extent of the shift in porosity of the carbon as a result of activation with KOH. The pore size distribution of the carbon precursor is shifted from meso-/macroporosity to almost exclusively microporosity. Upwards of 90% of the total pore volume of the product is contained in pores of <20 Å width and 99% in pores of <50 Å width. In Table 1, micropore volume, i.e., in pores of <20 Å width, was increased from 0.40 to 1.02 cc/g. Of greater relevance to methane adsorption, however, the volume in pores of <16 Å width was increased from 0.14 to 0.74 cc/g. The surface area of product TSA7 (2514 $m^2g^{-1}$) is an exceptionally high value for an almost totally microporous wood-based carbon.

It is noteworthy also that the granular nature of the precursor essentially is preserved by using the process described herein. This is in marked contrast to the KOH activation processes as previously described in reference to U.S. Pat. Nos. 4,082,694, 5,064,805, and 5,143,889 for the KOH-activation of carbonaceous precursors, which produce a low density, small particle size product that is difficult to handle, both during processing and in use.

Subsequent activation with KOH of lignocellulose-base, phosphoric acid carbonized/activated carbons also reduced the total residual phosphate content of the carbons. Although this effect was not surprising, the magnitude of the reduction was startling and, indeed, unexpected. The total residual phosphate content of the carbon was reduced from 5.3% to 0.01%. To place this finding in perspective, the lowest total residual phosphate content previously known to be obtained by washing and thermally post-treating a wood-based carbon was about 0.4%. Bearing in mind that some of the surface oxides of wood-based carbons are associated with the residual phosphate content of the carbon, the surface chemistry of the KOH-activated carbon may be significantly different from that of the lignocellulose-based carbon activated with phosphoric acid alone. For example, surface chemistry of the carbon could favor methane adsorption.

In summary, subsequent activation of phosphoric acid-activated lignocellulose material with KOH at high temperature shifts the pore size distribution of the carbon to a range favorable for methane adsorption. The micropore volume of the carbon is greatly enhanced to a level not previously obtained with a wood-based carbon. In the examples cited here, this resulted in a deliverable gas storage capacity of ≧150 v/v at 500 psi. This capacity represents an increase of greater than 65% over that obtained by activation of wood with $H_3PO_4$ alone. The granular nature of the precursor is retained following activation with KOH.

While the invention has been described and illustrated herein by references to various specific materials, procedures and examples, it is understood that the invention is not restricted to the particular materials, combination of materials, and procedures selected for that purpose. Numerous variations of such details can be employed, as will be appreciated by those skilled in the art.

What is claimed is:

1. A process for the manufacture of microporous activated carbon comprising sequential chemical activation stages including: a first activation stage comprising the steps of forming a first blend of a lignocellulose material with phosphoric acid, carbonizing the first blend at from about 300° to about 1,100° F. (about 150°–590° C.), and water washing the carbonized material; and a second activation stage comprising the steps of forming a second blend of the carbonized material and a potassium hydroxide solution, activating the second blend at from about 1,200° to about 1,800° F. (about 650°–980° C.), and water washing and drying the microporous activated carbon product which is characterized by greater than 80% of total pore volume comprising pores of less than 20 Å in width and greater than 95% of total pore volume comprising pores of less than 50 Å in width.

2. The process of claim 1 wherein the microporous activated carbon is characterized by greater than 50% of total pore volume comprising pores of less than 16 Å in width and greater than 95% of total pore volume comprising pores of less than 50 Å in width.

3. The process of claim 1 wherein the lignocellulose material is selected from the group consisting of wood chips, sawdust, wood flour, and coconut shell.

4. The process of claim 1 wherein the first blend comprises a ratio of phosphoric acid to lignocellulose material of from 1:1 to 3:1 and the second blend comprises a ratio of potassium hydroxide to carbonized material of from 0.5:1 to 4:1.

5. The process of claim 1 wherein the phosphoric acid is recovered in the washing step of the first activation stage and recycled for use in the first blend, and the potassium hydroxide is recovered as alkali in the washing step of the second activation stage and, following regeneration of the alkali, recycled for use in the second blend.

* * * * *